(No Model.)
F. H. ALLEN.
ROWLOCK.
No. 269,555. Patented Dec. 26, 1882.
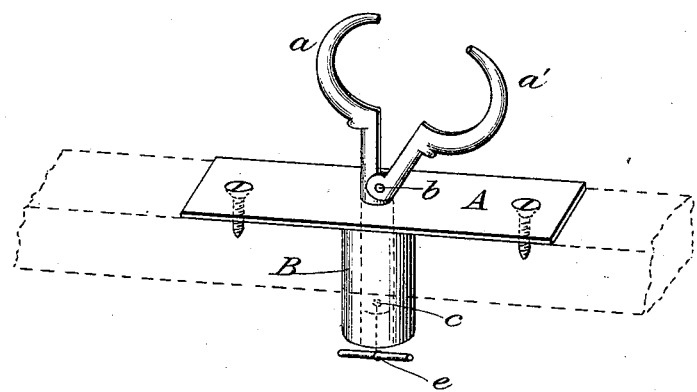
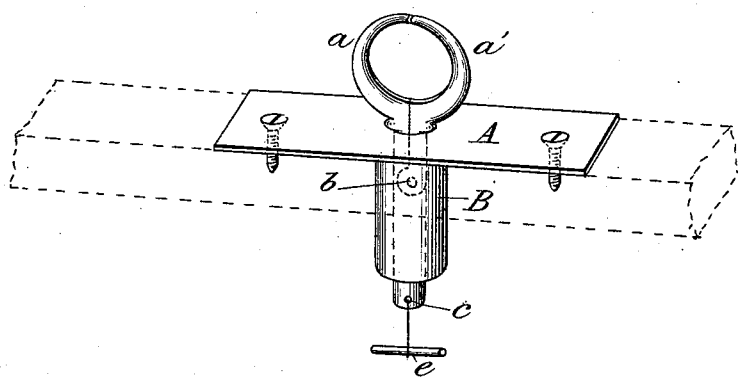
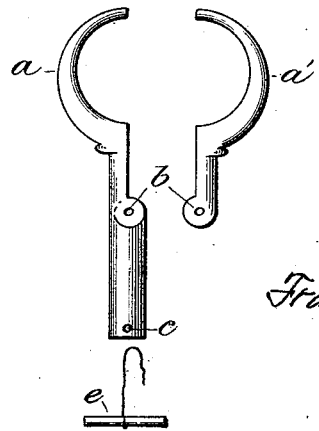
Witnesses:
C. L. Hopkins
John E. Warner
Inventor:
Frank H. Allen

UNITED STATES PATENT OFFICE.

FRANK H. ALLEN, OF NORWICH, CONNECTICUT.

ROWLOCK.

SPECIFICATION forming part of Letters Patent No. 269,555, dated December 26, 1882.

Application filed August 16, 1882. (No model.)

*To all whom it may concern:*

Be it known that I, FRANK H. ALLEN, of the city of Norwich, county of New London, and State of Connecticut, have invented certain new and useful Improvements in Rowlocks, which improvements are fully set forth and described in the following specification, reference being had to the accompanying drawings.

My immediate object is to produce at a low price a simple device specially suited to the needs of sportsmen, who in shooting hurriedly or fishing with trolling-gear cannot delay long enough to secure their oars before acting.

It is also particularly suitable for boats kept to rent, inasmuch as such boats are often rented to parties who are unaccustomed to boating and the use of oars.

In the accompanying drawings, Figure 1 represents my device attached to the gunwale of a boat and opened to receive an oar. Fig. 2 shows the same closed as in the act of rowing. Fig. 3 shows the several parts of the rowlock detached from each other.

Like letters refer to like parts in the several views.

A represents a metallic plate having a socket, B, as commonly constructed, said plate and socket being formed preferably of one piece of metal. The plate A, when in use, is secured rigidly to the gunwale by suitable screws.

My rowlock is composed of two principal parts, $a$ $a'$, said parts being connected by a rivet or screw, thus forming a perfect joint or hinge. (See $b$.) The upper ends or horns of $a$ $a'$, when closed, form a circle surrounding and supporting the oar, yet permitting the same free movement of the oar that is obtained in the open rowlock so commonly used. From the top of $a$ $a'$ to the hinge $b$ the pintle is made in two semicircular parts, said parts when brought together forming a round pintle and filling the opening in the socket B. One of the parts ($a$) extends below the hinge $b$ and through the socket B, thus forming a support when the rowlock is raised and the horns opened as in the act of removing or adjusting the oar. (See Fig. 1.)

In the lower end of the pintle is a hole, $c$, in which is fastened a cord or chain, supporting one or more toggles or cross-bars, $e$, to prevent the pintle from leaving the socket when raised hurriedly.

When the rowlock is closed and lowered into its proper place in the socket, as shown in Fig. 2, the parts $a$ $a'$ cannot open or spread, as the socket B, surrounding them, holds them together and makes the device practically as solid as if constructed of a single piece of metal.

The circular opening between the horns $a$ $a'$ should be large enough to allow a free movement of the oar, yet not large enough to allow the handle or large end of the oar to pass through.

To operate my device, raise the rowlock and open the horns $a$ $a'$, as shown in Fig. 1. Place the oar between the horns, when its weight will force the rowlock down in the socket, at the same time closing the horns around the oar. To remove the oar, raise it (the oar) until the toggle $e$ stops the pintle in the socket, when the horn $a'$ will drop by its own weight, (or may be forced open by hand,) when the oar may be removed.

I do not broadly claim a two-part rowlock; but

What I conceive to be new, and desire to cover by Letters Patent, is—

The combination, with the socket A, fixed rigidly in the gunwale of a row-boat, of the rowlock $a$, having a round pintle extending through said socket and working loosely in either an axial or vertical direction, and the auxiliary horn $a'$, said horn $a'$ being pivoted to the pintle $a$ at a point below the surface of the rigidly-fixed socket A, the horns of both $a$ and $a'$ forming, when closed, a complete metallic ring to encircle and hold in place the oar, as hereinbefore described, and for the purpose specified.

FRANK H. ALLEN.

Witnesses:
JOHN E. WARNER,
A. T. WINTERS.